(12) United States Patent
Lakkavalli

(10) Patent No.: US 10,003,517 B2
(45) Date of Patent: Jun. 19, 2018

(54) WIRELESS COMMUNICATION TEST SYSTEM ARRANGEMENT

(71) Applicant: Ixia, Calabasas, CA (US)

(72) Inventor: Shashidhar Viswanatha Lakkavalli, Oregon, CA (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 135 days.

(21) Appl. No.: 15/067,117

(22) Filed: Mar. 10, 2016

(65) Prior Publication Data

US 2017/0264524 A1    Sep. 14, 2017

(51) Int. Cl.
*H04L 1/00*      (2006.01)
*H04L 12/26*     (2006.01)
*H04W 24/06*     (2009.01)
*H04W 24/08*     (2009.01)

(52) U.S. Cl.
CPC ............. *H04L 43/14* (2013.01); *H04W 24/06* (2013.01); *H04W 24/08* (2013.01)

(58) Field of Classification Search
CPC ........ H04L 43/14; H04W 24/06; H04W 24/08
See application file for complete search history.

(56) References Cited

U.S. PATENT DOCUMENTS

| 2009/0313390 A1* | 12/2009 | Ahuja | G06F 13/409 710/2 |
| 2011/0122846 A1* | 5/2011 | Yu | H04L 1/0042 370/335 |
| 2012/0014284 A1* | 1/2012 | Ranganathan | H04L 49/70 370/254 |
| 2014/0089484 A1* | 3/2014 | Chin | H04L 41/00 709/223 |

OTHER PUBLICATIONS

"WaveTest Multi-client Traffic Generator/Performance Analyzer," IXIA Data Sheet, Document No. 915-6049-01 Rev F, p. 1-9, dated May 2015.

* cited by examiner

*Primary Examiner* — Ayaz Sheikh
*Assistant Examiner* — Hai-Chang Hsiung

(57) ABSTRACT

Systems and methods are disclosed herein to provide improved data communication test systems for the testing of wireless data communication devices and systems. A flexible arrangement of physical layer interfaces, hardware traffic generator/analyzers and software traffic generator/analyzers is disclosed that partitions the data communication test system into interfacing and processing modules. Such a system may offer improved capabilities such as a lower-cost and more efficient test system, a reduction in redundant processing capabilities, and a dynamic balancing of interfaces and processing power.

13 Claims, 6 Drawing Sheets

WIRELESS COMMUNICATION TEST SYSTEM ARRANGEMENT

TECHNICAL FIELD

The subject matter described herein relates generally to the test and measurement of wireless data communication systems; and more particularly to systems and methods for testing wireless devices and systems with multiple interfaces supporting multiple protocol stacks.

BACKGROUND

Sophisticated wireless data communications devices, systems and networks, such as cellular telephones and wireless LAN transceivers, are in widespread use worldwide. There is increasing need to support more data communication devices, with larger numbers of radio frequency (RF) as well as wired interfaces (e.g., Ethernet) for handling an increased number of user terminals within each network. Further, the rapidly increasing capabilities of the user terminals and wireless communication networks leads to a substantial increase in their data processing power as well as their supported protocol stacks. All of these, however, increase the complexity and scale of the wireless terminals, systems and networks, and drives the need to test the terminals and networks (i.e., the Devices Under Test or DUTs) during design and manufacturing. Manufacturers, vendors and users therefore have a greater need for more efficient, more cost-effective, and more flexible wireless data communications test systems.

Traditional methods of constructing such wireless communications test systems have relied on assemblies of self-contained line cards or modules. In traditional telecommunications switches, a line card is a printed circuit board that includes all of the facilities for maintaining a telephone line. In the context of the wired and wireless communications test systems described herein, a line card or module is a printed circuit board with various components mounted on the printed circuit board for performing a test and/or a communications function. Each line card is connected either physically (e.g., through a cable) or via electromagnetic coupling (e.g., using antennas) to one interface of the DUT. There are hence as many modules as there are DUT interfaces to be tested. Each line card, being self-contained, holds all of the necessary processing capabilities to support all of the protocols and data transmission functions of the wireless or wired interface that it is intended to test. Testing is generally conducted by activating one or more line cards, configuring them to establish connections to their corresponding DUT interfaces, and then creating test traffic flowing between the line cards through the DUT or System Under Test (SUT). The test traffic is then processed and analyzed to derive test results.

FIG. 1 depicts a representative example of such a test setup for testing a wireless DUT 100, which may contain one or more wireless (radio) interfaces 103, 106 and one or more wired interfaces 109. The wireless interfaces of DUT 100 are connected via sets of RF cables 102, 105 to wireless traffic generator and analyzer line cards 101, 104, which may (in this example) support different protocols, such as IEEE 802.11n and IEEE 802.11ac respectively. The wired interface of DUT 100 is connected via cable 108 to wired traffic generator and analyzer line card 107, which may support a wired protocol such as Ethernet. The test system is usually set up and managed by test configuration and management system 110, which reads the necessary test setup data 112, determines the appropriate settings and control commands for line cards 101, 104, 107, and controls these line cards via configuration and management interface 111.

Normal operation of the system depicted in FIG. 1 is reasonably straightforward. Test configuration and management system 110 obtains test setup data 112 and configures the line cards to communicate with DUT 100, execute the necessary wireless and wired protocols, generate and transmit traffic directed to the DUT, and receive and analyze traffic from the DUT. As it is usually necessary to for the test system to scale to large numbers of DUT interfaces, the processing power required to generate and analyze the totality of the test traffic normally far exceeds the capability of the test configuration and management system, or any one line card. Therefore, each traffic generator and analyzer line card contains all of the facilities necessary to execute the appropriate protocols and generate and analyze the required traffic.

A high-level block diagram of a typical traffic generator and analyzer line card is depicted in FIG. 2. As shown, line card 150 usually comprises a bank of one or more field programmable gate arrays (FPGAs) organized in groups 162, 163, as well as a group of one or more CPUs 161. For increased processing power, CPUs 161 may contain multiple cores. Line card 150 accepts configuration and control commands from configuration and management interface 156 and translates them to internal control commands in protocol and hardware/software traffic control functions unit 155. These control commands set up a software traffic generator and analyzer 151, a hardware traffic generator 152, a hardware traffic analyzer 154, and sets of software protocol stacks 153. These traffic generator, traffic analyzer, and protocol stack units then send and receive packets to/from a Medium Access Control (MAC) functions block 157, which in turn performs Open Systems Interconnection (OSI) Layer 2 protocol processing and sends/receives packets to/from a physical layer (PHY) module 158. PHY module 158 transmits/receives packets to the DUT using either a wired (e.g., Ethernet) or wireless (e.g., radio) interface.

Partitioning of line card 150 into these various functional blocks, such as software traffic generator/analyzer 151 vs. hardware traffic generator 152 and hardware traffic analyzer 154, is done in order to cope with the differing complexity and processing rate requirements of different kinds of protocol functions and test functions. For example, test functions at OSI Layer 7 (the Application Layer) is normally implemented using software traffic generator/analyzer 151, as generating and processing test traffic at Layer 7 is prohibitively complex for hardware implementation, such as in FPGAs. On the other hand, accurately generating and analyzing test traffic at maximum line rates, as is typically performed for OSI Layer 3 or Layer 2 testing, is usually implemented using hardware traffic generator 152 and hardware traffic analyzer 154, as it is very difficult for software systems to consistently and accurately function at such high packet rates. Similarly, protocol stacks are typically implemented in software, such as in software protocol stack sets 153, as they do not have significant performance requirements, but are too complex for realization in hardware. Finally, MAC and PHY functions are almost always implemented in hardware as they are simple but required to operate at very high rates.

It is apparent from FIG. 1 and FIG. 2 that each line card contains substantially identical functional blocks implemented in substantially identical ways. This is to permit maximum flexibility in testing; if the line cards implemented different functions, it would be necessary to disconnect and reconnect cables to reconfigure the system topology every time the test configuration was altered. For example, if in a particular test scenario the 802.11n traffic generator/analyzer line card 101 in FIG. 1 were used for application layer testing, its hardware traffic generator/analyzer elements (such as 150 and 154 in FIG. 2) would remain idle; on the other hand, if in the same scenario the 802.11ac traffic generator/analyzer line card 104 in FIG. 1 were used for bulk traffic generation, then the software traffic generator/analyzer elements (such as 151 in FIG. 2) would be unused.

A problem with this approach to implementing test systems is that the overall cost of the test system becomes very high due to the comparatively low utilization of the various elements. In any given test scenario it is extremely rare to find all of the different elements (e.g., the elements identified in FIG. 2) being simultaneously used. However, it is necessary to build the line cards of the test system in a homogeneous fashion with all of the elements present; otherwise, it would be time-consuming and tedious to manually rewire the test system for every test to improve utilization, assuming that heterogeneous line cards were used with differing capabilities for each line card.

A second disadvantage of this approach is that the maximum processing power available at any given line card is limited by the space and capacity of the line card itself, which may in turn be constrained by external factors such as the available chassis space and the size of the power supply. This makes it difficult to cope with ever-increasing data rates being achieved by both wired and wireless DUT interfaces. For example, a single line card might be able to support the processing power required to sustain 10 gigabits/second of traffic, but may not be able to contain the FPGAs and CPUs required to sustain 100 gigabits/second of traffic.

A third disadvantage of this approach is that the architecture and capabilities of the line card are fixed in all dimensions when the line card is originally designed. For example, a particular configuration and interconnection of FPGAs and CPUs may be created on the line card to support the anticipated needs of a target test setup. However, as wireless communications technology evolves, new protocols may arise that were not foreseen. It is then possible that while the FPGAs on the line card are adequate to the hardware requirements, their interconnection with the CPUs may not be sufficiently powerful to support the software needs of the new protocols. In this case the entire line card will need to be discarded and a new line card designed, in spite of the fact that a large portion of the existing line card is in fact still usable.

Existing wireless device test systems therefore suffer from significant shortcomings. There is hence a need for improved wireless data communication test systems and methods. A system that can improve the utilization of the elements comprising the test system is desirable. It is preferable for such a system to allow the processing power available to a line card to be expanded beyond the limits of space and power capacity of a single card. Finally, a system that permits individual elements of a line card to be upgraded to support increased protocol or traffic generation requirements, without necessitating the abandonment of the entire line card, is desirable.

SUMMARY

A network equipment test device includes sets of DUT interface components for interfacing with a physical layer interface of a DUT. The device further includes sets of hardware traffic generation and analysis components for generating packets to be sent to the DUT and for analyzing packets from the DUT using hardware. The device further includes sets of software traffic generation and analysis components for generating packets to be sent to the DUT and for analyzing packets from the DUT using software. The device further includes packet switch interfaces respectively associated with the sets of DUT interface components, the sets of hardware traffic generation and analysis components, and the sets of software traffic generation and analysis components and configurable to implement logical bindings between the sets of components. The device further includes a packet switch for switching traffic between the packet switch interfaces to direct test traffic to the DUT and direct traffic from the DUT to the packet switch interface associated with the sets of hardware or software traffic analysis components required for a particular test.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 3:
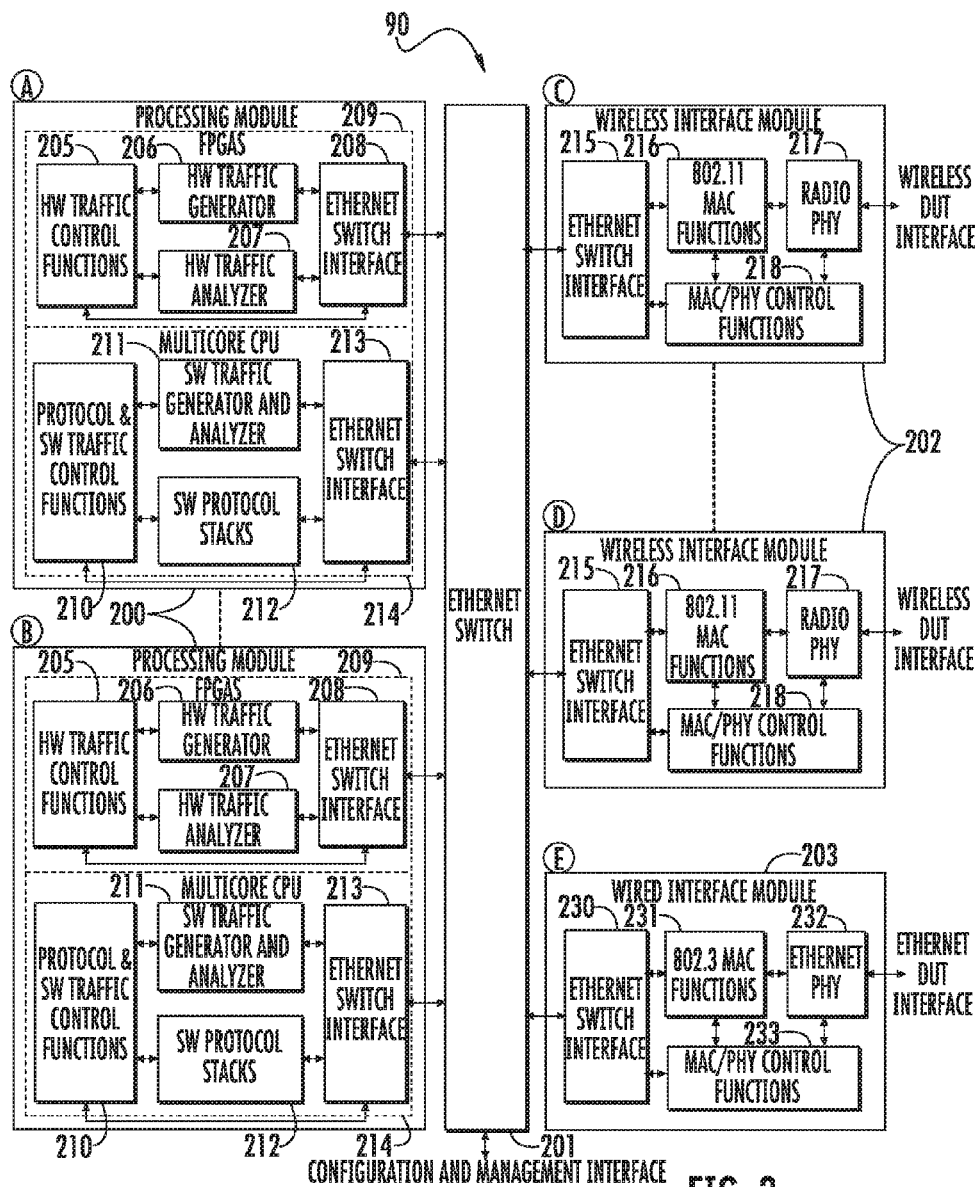
FIG. 3 is a block diagram of a partitioned test system with separate protocol and traffic generation/analysis modules and interface modules.

FIG. 3 shows a block diagram of a network equipment test device 90 where the line cards labeled A-E are partitioned into processing modules 200, wireless interface modules 202, and wired interface modules 203, linked together by Ethernet switch 201. Each wireless interface module 202 includes a set of DUT interface components, which in the illustrated example, comprises radio PHY 217, which implements the PHY layer and communicates to a wireless interface of the DUT; MAC functions 216, which implements the Layer 2 (MAC) functions for the wireless interface; and MAC/radio control functions 218, which configures and controls the PHY and MAC functions. Each wireless interface module 202 further includes a packet switch interface, such as an Ethernet switch interface 215, which permits MAC functions 216 and control functions 218 to be controlled and managed as well as transferring test data that is transmitted to or received from the DUT.

Each wired interface module 203 is similarly organized and also includes a set of DUT interface components, comprising wired PHY 232 connected to a wired interface of the DUT; MAC functions 231; and MAC/PHY control functions 233. Each wired interface module 203 further includes a packet switch interface, such as an Ethernet switch interface 230. It will be appreciated that the wired and wireless interface modules (203, 202) perform virtually no processing functions, apart from the minimal processing required to implement the MAC and PHY layers of the wired or wireless protocol layers. Instead, they accept test data from their Ethernet switch interfaces and transmit it to the DUT, and also receive test data from the DUT and forward it to their Ethernet switch interfaces.

Processing modules 200 perform nearly all of the traffic generation and analysis processing required in the test system. Each processing module comprises a set of hardware traffic generation and analysis components and a set of software packet generation and analysis components. Each processing module 200 includes FPGAs 209 as well as a multicore CPU 214. The hardware traffic generation and analysis components are implemented using FPGAs 209. In the illustrated example, the hardware traffic generation and analysis components include hardware traffic control functions 205, hardware traffic generator 206, and hardware traffic analyzer 207. The set of hardware packet generation analysis functions is connected to a packet switch interface, such as an Ethernet switch interface 208. Ethernet switch interface 208 accepts test traffic generated by hardware traffic generator 206 and forwards it on to Ethernet switch 201, and also accepts incoming test traffic from Ethernet switch 201 and passes it to hardware traffic analyzer 207. Hardware traffic control functions 205 accept configuration and control commands from Ethernet switch interface 208 and manage hardware traffic generator 206 and hardware traffic analyzer 207.

The set of software packet generation and analysis functions is implemented by CPU 214. In the illustrated example, CPU 214 also contains or includes an Ethernet switch interface 213, which sends and receives test traffic via Ethernet switch 201 as well as forwarding control and configuration messages. The set of software packet generation and analysis components implemented by CPU 214 includes: protocol and software traffic control functions 210, software traffic generator and analyzer 211, and software protocol stacks 212. Software traffic generator and analyzer 211 as well as software protocol stacks 212 generate and receive test packets forwarded by Ethernet switch interface 213.

In operation, the wireless interface modules 202 and wired interface modules 203 of the test system depicted in FIG. 3 are connected to the various wired and wireless interfaces of the using the appropriate cables. A test configuration and management system (not shown in the figure) communicates through Ethernet switch 201 to the MAC/PHY control functions 218, 233, and configures these to set up the desired MAC and PHY parameters required by the test scenario as well as the DUT. The test configuration and management system then communicates with processing modules 200, again through Ethernet switch 201, to configure them with the desired traffic generation and analysis functions. In addition, the test configuration and management system logically binds one or more processing modules with one or more wired or wireless interface modules so that generated and received traffic are routed correctly. Once the configuration is complete, the test configuration and management system issues commands to start and stop the test traffic. When the test has been completed and test traffic is stopped, the test configuration and management system reads out the results of the traffic analysis from processing module 200.

An exemplary element of the test configuration process is setting up the logical bindings between the processing modules and the interface modules. The use of Ethernet switch 201 as the interconnection medium allows these logical bindings to be set up by simply configuring appropriate addresses. Each Ethernet switch interface block 208, 215, 230 is assigned a unique Ethernet MAC address as well as a unique Internet Protocol (IP) address. The test configuration and management system may then set up logical bindings by configuring each Ethernet switch interface block 208, 215, 230 with the address of its partner to which all test data traffic must be sent.

For example, if it is assumed that wired interface module 203 labeled E at the bottom of the figure is to be assigned the resources of processing module 200 labeled A at the top of the figure, the Ethernet switch interfaces 208, 213 in the latter processing module 200 labeled A are configured with the Ethernet and IP addresses of wired interface module 203 labeled E. Similarly the Ethernet switch interface 230 in the former wired interface module are configured with the Ethernet and IP addresses of processing module 200 labeled A. When test traffic received from the DUT by wired interface module 203 labeled E, it is addressed according to this configuration, and sent to Ethernet switch 201, which automatically forwards the traffic to processing module 200 labeled A. Test traffic that is generated by processing module 200 labeled A to be forwarded to the DUT is similarly addressed and sent to Ethernet switch 201, which automatically forwards it to wired interface module 203 labeled E.

Configuring logical bindings by means of Ethernet and IP addressing may be extended further to encompass the processing of different types of packets by hardware and software functions. For example, Ethernet switch interfaces 208, 213 in processing module 200 labeled A may be assigned different Ethernet and IP addresses, and Ethernet switch interface 230 in wired interface module 203 labeled E configured accordingly. MAC functions block 231 may then be further configured to distinguish between low-level traffic that should be handled by hardware traffic analysis, versus high-level traffic that must be handled by software traffic analysis. When MAC functions block 231 receives and forwards traffic to Ethernet switch interface 230, it can then also tag the forwarded traffic with the intended target (either hardware or software traffic analyzer); Ethernet switch interface 230 can then direct the traffic to the appropriate Ethernet/IP addresses, and switch 201 will pass the traffic on to the correct destination.

In order to appropriately tag traffic, each MAC functions block 216, 231 may inspect/classify packets. For classifying packets, each MAC functions block 216, 231 rely on Ethernet headers, IP headers, transport layer headers, or any combination of fields from one or more of these headers. Before packets can be classified, each MAC functions block 216, 231 needs to be programmed with classifiers/filters/tags. Using flow signatures in the data may not be sufficient, because data could be SSL encrypted for example (assuming that MAC/PHY decryption is already performed by the MAC/PHY blocks and what traverses the Ethernet switch interfaces is at least MAC decrypted packets). In one exemplary implementation, packets may be classified by each MAC functions block 216, 231 in one of the following ways:
1. Define a signature as a combination of fields in the MAC, IP and transport headers. Such a signature may be similar to packet signatures used in monitoring traffic.
2. Use one or more of the following fields typically used for filtering to make the decision on forwarding.
Some examples of filtering include—
1. Ethernet type is EAPOL (0x88ee) or pre authentication (0x88c7)
2. WLAN frame type is management
3. The socket tuple match (layer4id)
4. Destination and/or source MAC address match.
5. Destination and/or IP address match,
6. Traditional flow signature By establishing such filters, a lookup function associated with each MAC functions block 216, 231 first tags packets, and then based on established tag to module mapping, the associated Ethernet switch interface 215, 230 may make the choice of whether the packet needs to be sent to the hardware module or software module. In the above list, examples (1) and (2) will go to the software module. (3) goes to the hardware module. (4) and (5) can go to either, based on the flow. (6) can go to hardware.

In one exemplary implementation, the packets that each Ethernet switch interface 215, 230 needs to forward can be of different MAC types. MAC functions blocks 216, 231 can use the original packet content to tag packets for routing by Ethernet switch interfaces 215, 230 but prior to forwarding to the next hop, the outer MAC header needs to be altered so that the packet will be MAC addressed to the next hop. The question here is whether MAC based encapsulation/decapsulation is sufficient is IP encapsulation/decapsulation needed. Since all the modules are connected to Ethernet switch 201, Ethernet based encapsulation/decapsulation may be sufficient.

A further benefit of such a logical addressing approach for binding processing module resources to interface modules is that the nature and amount of processing module resources dedicated to a given interface module may be arbitrarily changed for different test scenarios (or even within the same test scenario) by properly configuring MAC and IP addressing in the various Ethernet switch interfaces 208, 213, 215, 230. For instance, a particular test scenario might require wired interface module 203 labeled E in FIG. 3 to utilize twice the amount of software traffic generation and analysis processing power as compared to the normal case, but might not require any hardware traffic generation and analysis. This is easily handled by configuring Ethernet switch interfaces 213 in processing module 200 labeled A as well as processing module 200 labeled B to direct their data to wired interface module 203 labeled E, and vice versa. As the corresponding hardware traffic generation and analysis functions (coupled to Ethernet switch interfaces 208 in processing modules 200 labeled A and B) are not required by wired interface module 203 labeled E, they may be configured to be used by any other interface module in the test system. This can substantially improve the overall utilization of the test system.

It will be apparent that if Ethernet switch 201 is designed as a fully non-blocking switch (i.e., with forwarding capability only limited by the capacity of its ports), then the amount of test traffic that can be sustained by any interface module is limited only by the capacity of Ethernet switch interfaces 215, 230. It is therefore sufficient to ensure that Ethernet switch interfaces 215, 230 have at least as much capacity as the corresponding DUT interface port. For example, if wired interface module 203 is a Gigabit Ethernet interface, then its corresponding Ethernet switch interface 230 should likewise support at least 1 gigabit/second of capacity.

With this being taken into account, it will be evident that the test system in FIG. 3 completely decouples the capacity of the interface modules from the capacity of the processing modules. If a new, higher speed interface module is created and added to the system, it is not necessary to redesign the processing modules to match the higher requirements. Instead, multiple existing processing modules 200 can be logically combined to support the higher processing requirements of a new interface module, with the only change being the configuration of MAC and IP addresses for binding purposes. This can significantly reduce the need to redesign parts or all of the system to cope with advancing technologies.

Figure 4:
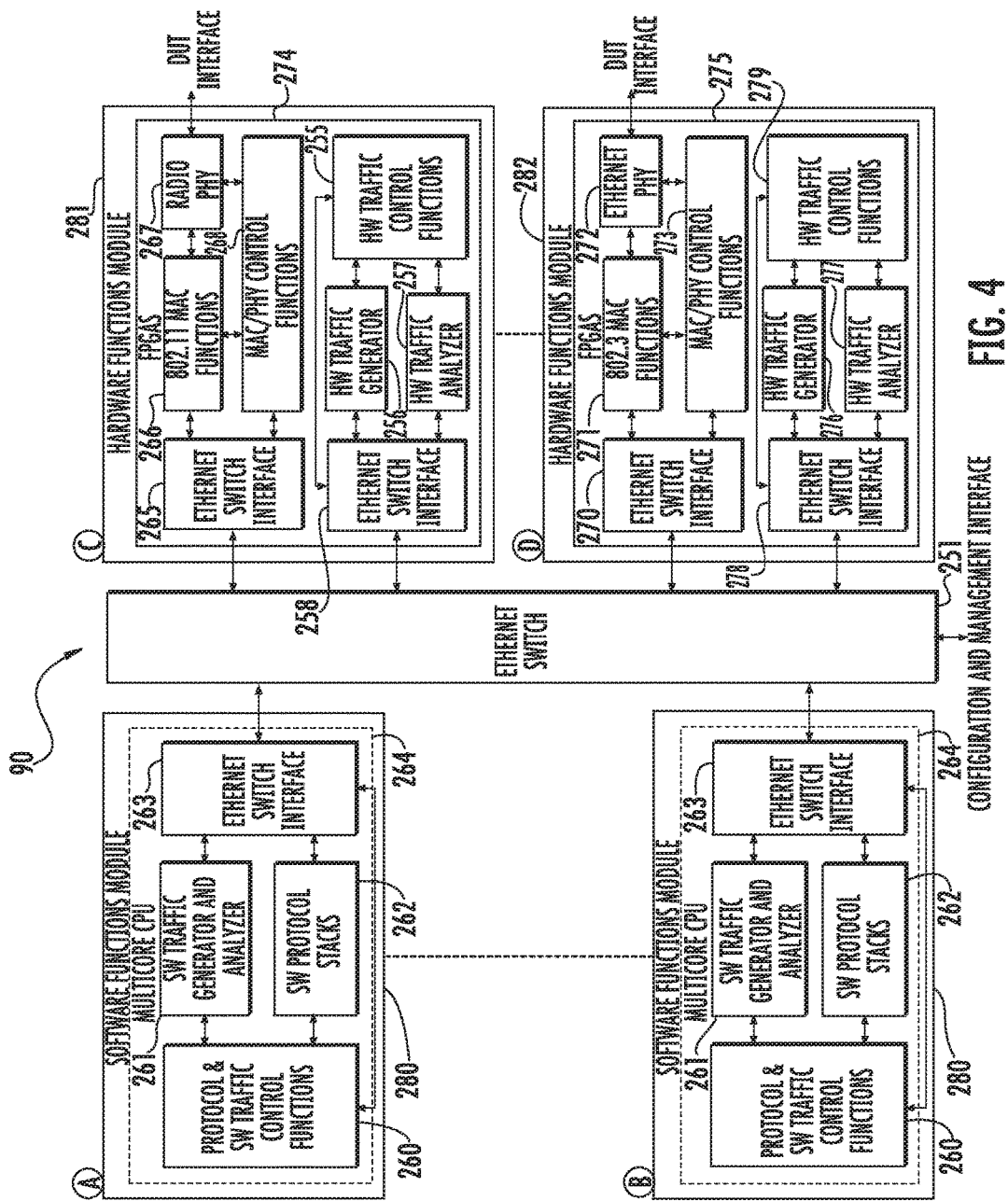
FIG. 4 is a block diagram of a test system with separate FPGA and CPU modules.

Turning now to FIG. 4, a different partitioning of modules in network equipment test device 90 is depicted. In this case, the modules are partitioned according to whether they support software-based functions or hardware based functions. Software functions modules 280 are implemented using CPUs, which may be multicore CPUs, to support software traffic generator and analyzer function 261 and software protocol stacks 262, which are controlled by protocol and software traffic control functions 260. All of the elements 260, 261, 262 are interfaced to Ethernet switch interface 263, which in turn forwards test traffic as well as control commands between the elements 260, 262, 263 and Ethernet switch 251.

On the other hand, hardware functions modules 281 are implemented using FPGAs. Wireless hardware functions module 281 contains radio PHY 267 which interfaces to the DUT wireless interfaces, MAC functions 266 that implements the wireless MAC protocol, and MAC/PHY control functions 268 that controls and configures MAC functions 266 and radio PHY 267. Ethernet switch interface 265 forwards traffic between Ethernet switch 251 and MAC 266, as well as control functions 268. Wireless hardware functions module 281 also contains hardware traffic generator 256 and hardware traffic analyzer 257 which are configured and controlled by hardware control functions 255, all of which are coupled to Ethernet switch interface 258 which allows them to transfer test traffic and control messages. All of these are contained within FPGAs 274.

Wired hardware functions module 282 is similarly organized, with wired PHY 272, MAC functions 271, MAC/PHY control functions 273, and associated Ethernet switch interface 270; as well as hardware traffic generator 276, hardware traffic analyzer 277, hardware traffic control functions 279, and associated Ethernet switch interface 278. These are likewise contained within FPGAs 275.

Operation of the test system depicted in FIG. 4 follows virtually the same principles as that of the system depicted in FIG. 3. The various Ethernet switch interfaces 263, 265, 258, 270, 278 are configured to logically bind software processing functions and hardware processing functions to the desired interfaces, after which tests may be performed and test traffic may be run. As each individual subsystem— i.e., software traffic generator, hardware traffic generator, and interface—has its own individual connection to Ethernet switch 251, arbitrary bindings may be made between them to implement any desired topology. It is apparent, therefore, that the system of FIG. 4 shares all of the principal advantages of the system of FIG. 3.

The system of FIG. 4 may be beneficial for decoupling CPU and FPGA technologies. For example, CPU technology generations may advance at a different rate from FPGA technology generations, in terms of processing power, size and power consumption. By placing all CPU resources on one set of modules and all FPGA resources on a different set of modules, the partitioning of FIG. 4 permits each set of modules to be replaced without being forced to replace the other set. By this means, the test system may be incrementally upgraded while retaining the maximum cost-effectiveness and utilization of existing components.

Figure 5:
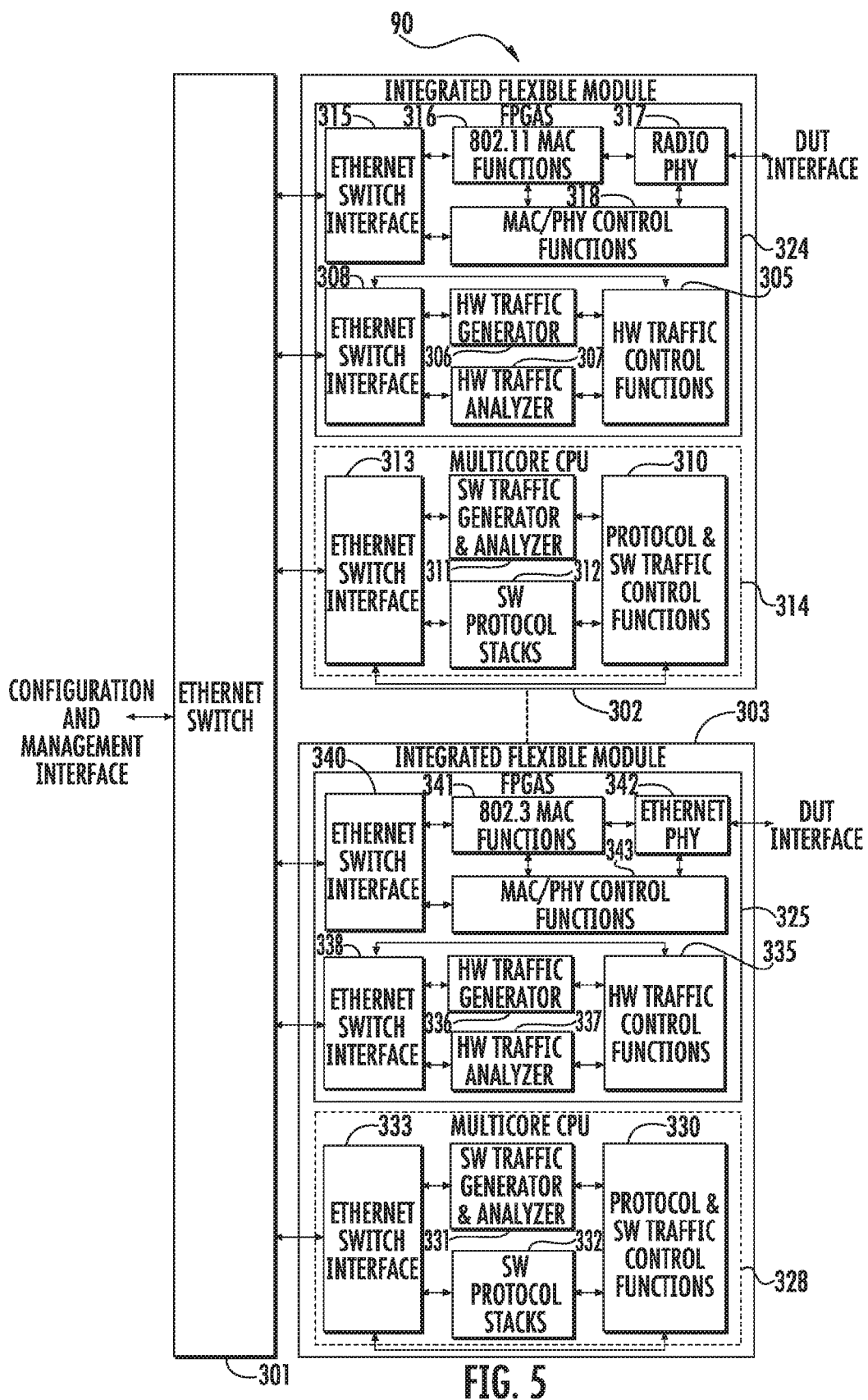
FIG. 5 is a block diagram of a test system with a single type of line card that allows flexible partitioning.

FIG. 5 represents a yet different partitioning of the components of network equipment test device 90 from the examples illustrated in FIG. 3 and FIG. 4. Here only one type of module is created, containing DUT interfaces (which may be wireless or wired) as well as hardware and software processing functions. The modules are interconnected by means of an Ethernet switch so that they may both interchange packets as well as communicate with a configuration and management system.

As shown in FIG. 5, integrated module 302, which is for example a radio interface module, contains a group of FPGAs 324 and one or more CPUs 314, which may be multicore CPUs. FPGAs 324 implement 802.11 radio PHY 317, 802.11 MAC functions 316, and MAC/PHY control functions 318. Test traffic data as well as control information is passed to the various elements by Ethernet switch interface 315, which in turn is connected to Ethernet switch 301. FPGAs 324 also contain a hardware traffic generator/analyzer, in the form of hardware traffic generator unit 306, hardware traffic analyzer unit 307, hardware traffic control functions 305, and Ethernet switch interface 308. The latter interfaces to Ethernet switch 301 by a separate connection.

Multicore CPUs 314 implement a software traffic generator/analyzer function 311 as well as protocol stacks function 312, which implements complex networking protocols in software. These two elements are controlled and managed by protocol and software traffic control functions 310. All of these functions communicate with Ethernet switch interface 313; as with the other Ethernet switch interfaces, this latter also interfaces with Ethernet switch 301 using a separate connection.

Wired interface module 303 is constituted very similarly to wireless interface module 302, again being comprised of a group of FPGAs 325 and one or more CPUs 326. FPGAs 325 now implement a wired Ethernet DUT interface, comprising 802.3 Ethernet PHY 342, 802.3 MAC functions 341, MAC/PHY control functions 343, and Ethernet switch interface 340. In addition, FPGAs 325 implement hardware traffic generator 336, hardware traffic analyzer 337, hardware traffic control functions 335, and Ethernet switch interface 336. Finally, multicore CPU 326 implements software traffic generator/analyzer 331, software protocol stacks 332, protocol and software traffic control functions 330, and Ethernet switch interface 333. These blocks function similarly to like-named blocks in integrated module 302 (as well as like-named blocks in FIG. 3 and FIG. 4).

Operation of the system in FIG. 5 follows the same lines as that shown in FIG. 4 and FIG. 3. The configuration and management system utilizes its interface to Ethernet switch 301 to configure the various elements in the system, as well as to set up logical bindings between the different Ethernet switches 315, 308, 313, 340, 338, and 333. As each individual Ethernet switch interface (serving a separate submodule within either of integrated modules 302, 303) has a separate connection to Ethernet 301, it is possible for the configuration and management system to set up any arbitrary system of logical bindings, disregarding the actual physical modules on which the hardware functions are actually implemented. For example, the hardware traffic generation/analysis resources in module 302 may be assigned to the Ethernet DUT interface in module 303 by simply setting up a logical binding between Ethernet switch interfaces 308 and 340. In a similar manner, the wireless DUT interface contained within integrated module 302 may be assigned both of the software processing resources in modules 302, 303 by setting up logical bindings between Ethernet switch interface 315, 313, and 333. In this manner, a given interface module may acquire as much (or as little) of the available processing resources in the entire system as necessary.

Figure 1:
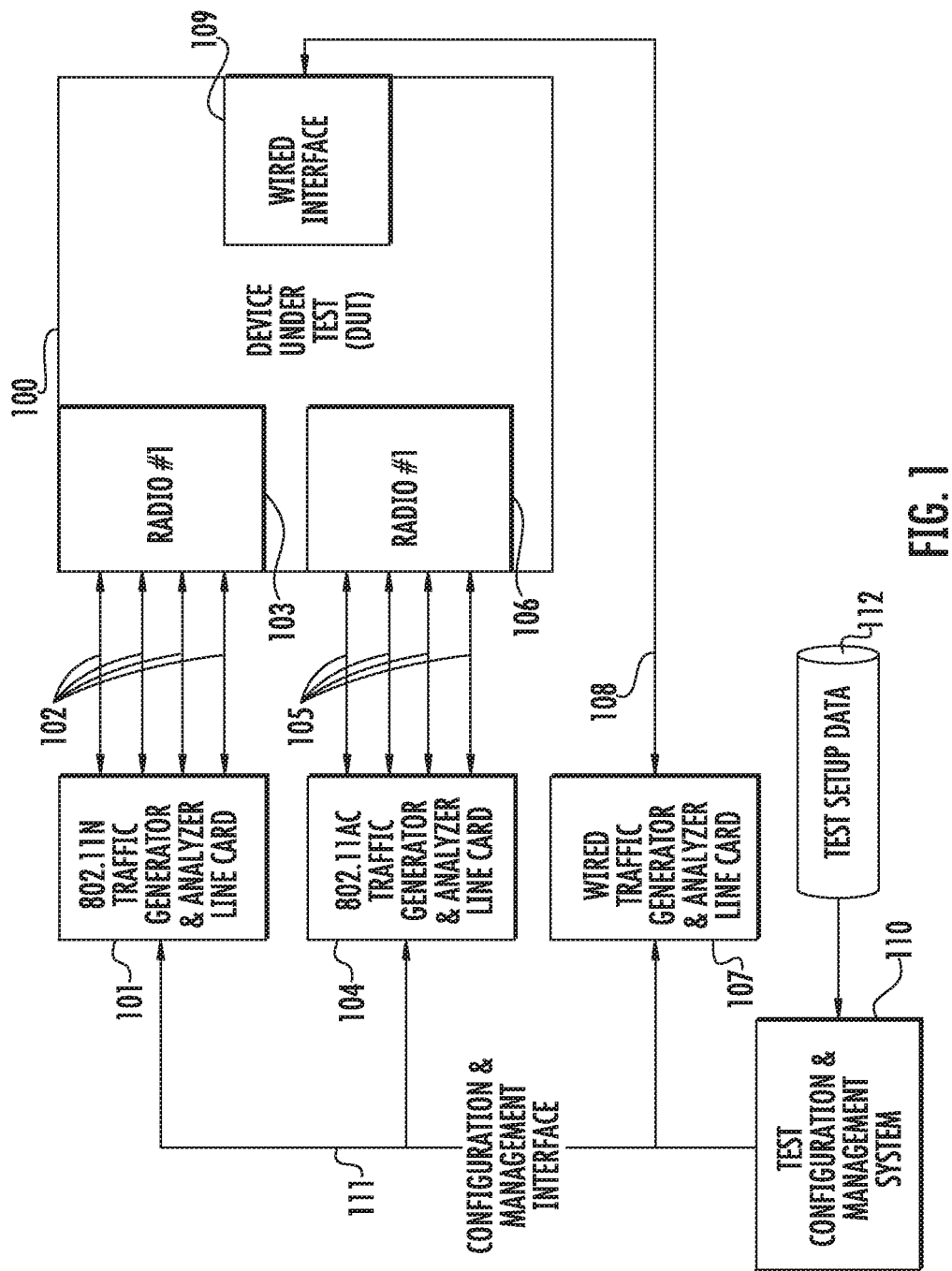
FIG. 1 is a high-level block diagram of a test system comprising a DUT and several line cards.
Figure 2:
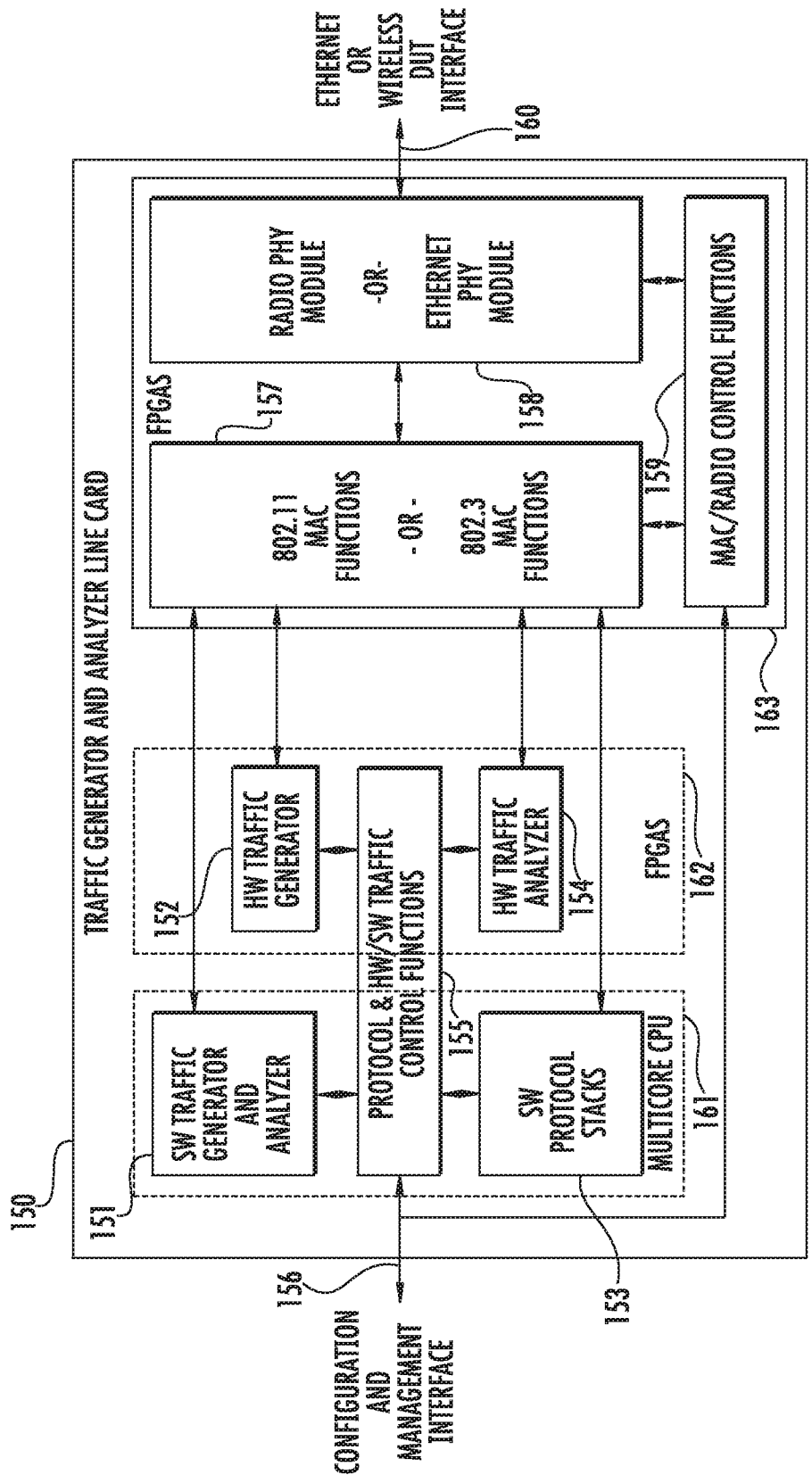
FIG. 2 is a block diagram of the typical elements of a single line card.

The arrangement of FIG. 5 is advantageous in that a single type of module may be used for all of the line cards in the test system (similarly to the arrangement depicted in FIG. 1 and FIG. 2) but nevertheless the shortcomings of the existing test system are not present. Unused processing capacity or resources in any given line card can be easily reassigned to another line card. Further, any DUT interface that requires additional processing power can be assigned resources from other cards without being forced to design new line cards or manually reconfiguring the system. This is rendered feasible by utilizing separate Ethernet switch interfaces for each of the logically separate functions on each integrated line card. It is apparent that the system of FIG. 5 provides implementation benefits of a homogeneous design, while still offering some of the utilization and flexibility benefits of the systems depicted in FIG. 3 and FIG. 4.

Figure 6:
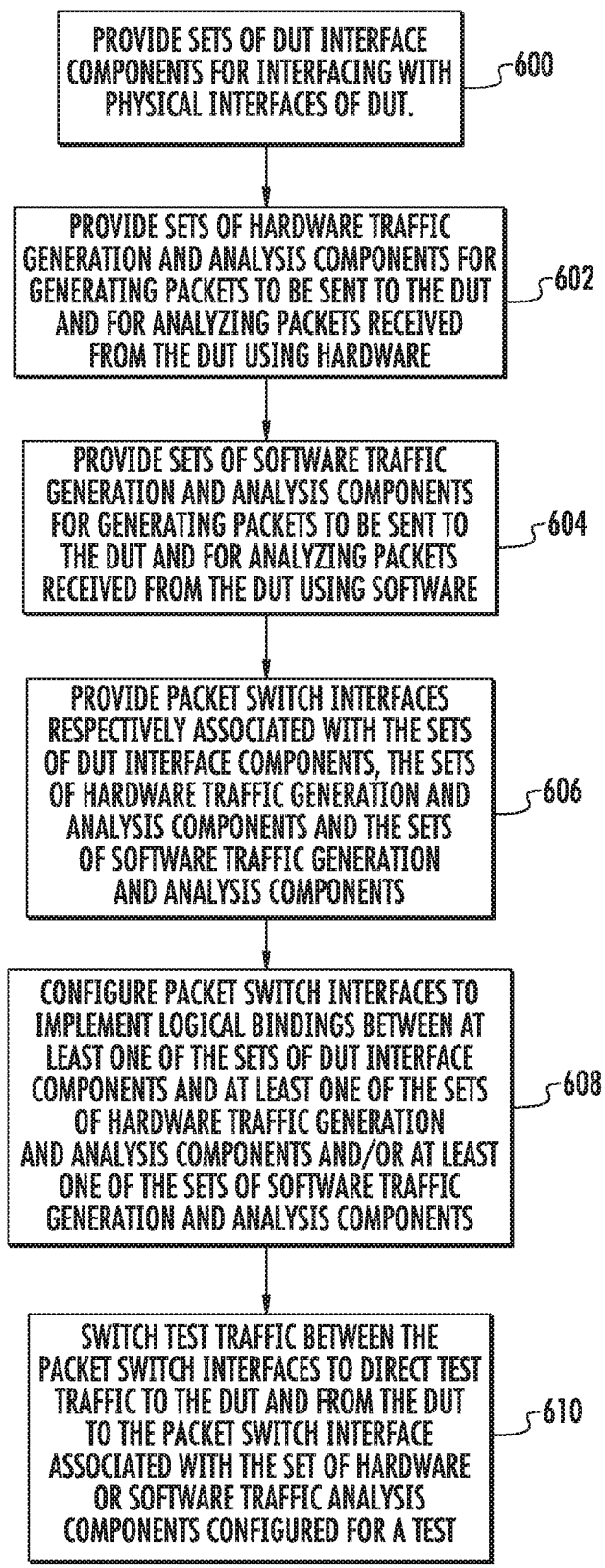
FIG. 6 is a flow chart illustrating an exemplary process for testing a DUT.

FIG. 6 is a flow chart illustrating an exemplary process for testing a network device according to an embodiment of the subject matter described herein. Referring to FIG. 6, in step 600, sets of DUT interface components for interfacing with a physical layer interface of a DUT are provided. For example, individual sets of DUT interface components, where each set includes MAC functions block 316, radio or Ethernet PHY 317 or 342, and MAC/PHY control functions block 318, may be provided.

In step 602, the process includes providing sets of hardware traffic generation and analysis components for generating packets to be sent to the DUT and for analyzing packets from the DUT using hardware. For example, individual sets of hardware traffic generation and analysis components, each set including hardware traffic control functions block 335, hardware traffic analyzer 337, and hardware traffic generator 336, may be provided.

In step 604, the process includes providing sets of software traffic generation and analysis components for generating packets to be sent to the DUT and for analyzing packets from said DUT using software. For example, individual sets of software traffic generation and analysis components, each set including software traffic generator and analyzer 331, software protocol stacks 332, and protocol and software traffic control functions 330, may be provided.

In step 606, the process includes providing packet switch interfaces respectively associated with the sets of DUT interface components, the sets of hardware traffic generation and analysis components, the sets of software traffic generation and analysis components. For example, Ethernet switch interfaces 308, 313, 315, 333, 338, and 340 may be provided to separately and individually connect each set of hardware traffic generation and analysis components, software traffic generation and analysis components, and DUT interface components together.

In step 608, the process includes configuring the packet switch interfaces to implement logical bindings between the DUT interface components and at least one of the sets of hardware traffic generation and analysis components and/or at least one of the sets of software traffic generation and analysis components. For example, a user may configure, via the configuration and management interface, each of Ethernet switch interfaces 308, 313, 315, 333, 338, and 340 to implement logical bindings between the sets of components required for individual tests. Configuring the Ethernet switch interfaces to implement the logical bindings may include populating the forwarding tables associated with each interface to forward different types of traffic to the Ethernet switch interfaces associated with the set of processing or interface modules required for a particular test.

In step 610, the process includes switching traffic between the packet switch interfaces to direct test traffic to the DUT and direct traffic from the DUT to the packet switch interface associated with the hardware or software traffic analysis components required for a particular test. For example, Ethernet switch 301 may direct traffic between Ethernet switch interfaces 308, 313, 315, 333, 338, and 340 during at test to implement performance testing, functional testing, stress testing, simulated attack testing, or any other suitable testing of a DUT.

Many other embodiments and applications of this arrangement may be apparent to persons skilled in the art. The arrangement may be extended across multiple chassis containing multiple sets of line cards by providing interfaces between the Ethernet switches associated with each individual chassis, so that logical bindings may be made between Ethernet switch interface modules located on line cards in different chassis. Alternatively, the Ethernet switch itself may be removed from the chassis and provided as an external module; this permits a still more flexible arrangement where the Ethernet switch can be replaced as technology evolves, without replacing any of the line cards.

What is claimed is:

1. A network equipment test device comprising:
  a plurality of sets of device under test (DUT) interface components for interfacing with a physical layer interface of a DUT;
  a plurality of sets of hardware traffic generation and analysis components for generating packets to be sent to the DUT and for analyzing packets from the DUT using hardware;
  a plurality of sets of software traffic generation and analysis components for generating packets to be sent to the DUT and for analyzing packets from the DUT using software;
  a plurality of packet switch interfaces respectively associated with the sets DUT interface components, the sets of hardware traffic generation and analysis components, the sets of software traffic generation and analysis components and configurable to implement logical bindings between the sets of components; and
  a packet switch for switching traffic between the packet switch interfaces to direct test traffic to the DUT and direct traffic from the DUT to the packet switch interfaces associated with the sets of hardware or software traffic analysis components required for a particular test, wherein the sets of DUT interface components each include a medium access control (MAC) functions block configured to identify traffic from the DUT requiring analysis by the sets of software traffic analysis components and traffic requiring analysis by the sets of hardware traffic analysis components, wherein the MAC functions blocks are configured to tag the traffic identified as requiring analysis by the sets of software traffic analysis components with identifiers for the sets of software traffic analysis components and to tag the traffic as requiring analysis by the sets of hardware traffic analysis components with identifiers for the sets of hardware traffic analysis components.

2. The network equipment test device of claim 1 wherein the packet switch interfaces associated with the sets of software traffic generation and analysis components are configurable to establish logical bindings with the sets of DUT interface components to implement traffic flow from the sets of DUT interface components to packet switch interfaces associated with specific ones of the sets of software packet processing components and to send generated traffic to the DUT through specific ones of the sets of DUT interface components.

3. The network equipment test device of claim 1 wherein the packet switch interfaces are configurable to arbitrarily assign processing resources of a given type to a given test scenario.

4. The network equipment test device of claim 3 wherein the packet switch interfaces are configurable to assign the sets of hardware traffic generation and analysis components to a particular test separately and independently from the sets of hardware traffic generation and analysis components.

5. The network equipment test device of claim 1 comprising a plurality of line cards, wherein the sets of DUT interface components are located on separate ones of the line cards from the sets of hardware traffic generation and analysis components and the sets of software traffic generation and analysis components.

6. The network equipment test device of claim 5 wherein the sets of hardware and software traffic generation and analysis components are located on the same line cards.

7. The network equipment test device of claim 1 comprising a plurality of line cards, wherein the sets of DUT interface components are located on the same line cards as the sets of hardware traffic generation and analysis components and on separate line cards from the sets of software traffic generation and analysis components.

8. The network equipment test device of claim 1 comprising a plurality of line cards, wherein the sets of DUT interface components are located on the same line cards as the sets of hardware traffic generation and analysis components and the sets of software traffic generation and analysis components.

9. A network equipment test device comprising:
  a plurality of line cards;
  a plurality of sets of device under test (DUT) interface components implemented on a first set of the line cards for interfacing with a physical layer interface of a DUT;
  a plurality of sets of software traffic generation and analysis components implemented on a second set of the line cards separate from the first set for generating packets to be sent to the DUT and analyzing packets from the DUT using software;
  a plurality of sets of hardware traffic generation and analysis components for generating packets to be sent to the DUT and analyzing packets from the DUT using hardware;
  a plurality of Ethernet switch interfaces respectively associated with the sets DUT interface components, the sets of hardware traffic generation and analysis components, and the sets of software traffic generation and analysis components and configurable to implement logical bindings between the components; and
  an Ethernet switch for switching traffic between the Ethernet switch interfaces to direct test traffic to the DUT and direct traffic from the DUT to the Ethernet switch interface associated with the hardware or software traffic analysis components required for a particular test, wherein the sets of DUT interface components each include a medium access control (MAC) functions block configured to identify traffic from the DUT requiring analysis by the sets of software traffic analysis components and traffic requiring analysis by the sets of hardware traffic analysis components, wherein the MAC functions blocks are configured to tag the traffic identified as requiring analysis by the sets of software traffic analysis components with identifiers for the sets of software traffic analysis components and to tag the traffic as requiring analysis by the sets of hardware traffic analysis components with identifiers for the hardware traffic analysis components.

10. The network equipment test device of claim 9, wherein the Ethernet switch interfaces associated with the sets of software traffic generation and analysis components are configurable to establish logical bindings with the sets of DUT interface components to implement traffic flow from the sets of DUT interface components to Ethernet switch interfaces associated with specific ones of the sets of software traffic analysis components and to send generated traffic to the DUT through specific ones of the sets of DUT interface components.

11. The network equipment test device of claim 9 wherein the Ethernet switch interfaces are configurable to arbitrarily assign processing resources of a given type to a given test scenario.

12. The network equipment test device of claim 11 wherein the Ethernet switch interfaces are configurable to assign the sets of hardware traffic generation and analysis components to a particular test separately and independently from the sets of software packet generation and analysis components.

13. A method for testing a network device, the method comprising:
providing a plurality of sets of device under test (DUT) interface components for interfacing with a physical layer interface of a DUT;
providing a plurality of sets of hardware traffic generation and analysis components for generating packets to be sent to the DUT and analyzing packets from the DUT using hardware;
providing a plurality of sets of software traffic generation and analysis components for generating packets to be sent to the DUT and analyzing packets from the DUT using software;
providing a plurality of packet switch interfaces respectively associated with the sets of DUT interface components, the sets of hardware traffic generation and analysis components, and the sets of software traffic generation and analysis components;
configuring the packet switch interfaces to implement logical bindings between the DUT interface components and at least one of the sets of hardware traffic generation and analysis components and/or at least one of the sets of software traffic generation and analysis components; and
switching traffic between the packet switch interfaces to direct test traffic to the DUT and direct traffic from the DUT to the packet switch interface associated with the hardware or software traffic analysis components required for a particular test, wherein the sets of DUT interface components each include a medium access control (MAC) functions block configured to identify traffic from the DUT requiring analysis by the sets of software traffic analysis components and traffic requiring analysis by the sets of hardware traffic analysis components, wherein the MAC functions blocks are configured to tag the traffic identified as requiring analysis by the sets of software traffic analysis components with identifiers for the sets of software traffic analysis components and to tag the traffic as requiring analysis by the sets of hardware traffic analysis components with identifiers for the hardware traffic analysis components.

\* \* \* \* \*